United States Patent [19]
Okamori et al.

[11] Patent Number: 6,139,156
[45] Date of Patent: *Oct. 31, 2000

[54] LIGHT SOURCE DEVICE AND PROJECTION TYPE DISPLAY APPARATUS

[75] Inventors: Shinji Okamori; Shinsuke Shikama, both of Tokyo, Japan

[73] Assignee: Mitsubishi Denki Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/190,176

[22] Filed: Nov. 12, 1998

[30] Foreign Application Priority Data

Nov. 12, 1997  [JP]  Japan ..................................... 9-310434

[51] Int. Cl.⁷ ...................................................... G03B 21/14
[52] U.S. Cl. ............................. 353/98; 353/102; 385/146; 359/894
[58] Field of Search ................................ 353/98, 38, 102, 353/122; 362/32, 335, 336, 308; 385/48, 130, 131, 146; 359/900, 503, 894

[56] References Cited

U.S. PATENT DOCUMENTS

| | | | |
|---|---|---|---|
| 5,059,013 | 10/1991 | Jain | 359/900 |
| 5,625,738 | 4/1997 | Magarill | 385/146 |
| 5,634,704 | 6/1997 | Shikama et al. | 353/31 |
| 5,748,376 | 5/1998 | Lin et al. | 359/485 |
| 5,829,858 | 11/1998 | Levis et al. | 353/98 |
| 5,860,721 | 1/1999 | Bowron et al. | 353/38 |
| 5,868,481 | 2/1999 | Conner et al. | 353/38 |
| 5,902,033 | 5/1999 | Levis et al. | 353/98 |

FOREIGN PATENT DOCUMENTS

| | | |
|---|---|---|
| 764862A1 | 3/1997 | European Pat. Off. . |
| 64049017 | 2/1989 | Japan . |
| 2001888 | 1/1990 | Japan . |

*Primary Examiner*—William Dowling
*Attorney, Agent, or Firm*—Birch, Stewart, Kolasch & Birch LLP

[57] ABSTRACT

A light source device or a projection type display apparatus has a pillar optical element; a condenser means; and a first lens effective to focus the image of the emitting end face of the pillar optical element at a surface to be irradiated; wherein the pillar optical element includes a tapered portion on a side of the incident end face and a non-tapered pillar portion on a side of the emitting end face, a cross-sectional area of the tapered portion continuously increasing from the incident end face toward the emitting end face and a cross-sectional area of the non-tapered pillar portion being constant.

14 Claims, 12 Drawing Sheets

LIGHT SOURCE DEVICE AND PROJECTION TYPE DISPLAY APPARATUS

BACKGROUND OF THE INVENTION

The present invention relates to a light source device capable of controlling a spread angle of a condensed luminous flux from a light source and of irradiating a rectangular region evenly with a high illuminance, and a projection type display apparatus which incorporates such light source device.

FIG. 10 illustrates a prior art arrangement for a projection type display apparatus including a pillar optical element and a light valve, as disclosed in U.S. Pat. No. 5,634,704. In this Figure, a numeral 2 represents a light valve of transmission type, 3 a projection lens, 4 a screen, 11 a lamp, 12 an elliptical mirror, 130 a rod integrator, 14 a relay lens, 15 a field lens and $L_1$ a luminous flux emitted by the lamp 11 and condensed by the elliptical mirror 12.

Describing the operation of the prior art arrangement, the center of emission of the lamp 11 is disposed in the vicinity of a first focal point of the elliptical mirror 12, whereby luminous flux emitted by the lamp 11 is condensed at a second focal point after its reflection by the elliptical mirror 12. The rod integrator 130 has an incident end face which is disposed in the vicinity of the condensing point or the second focal point of the elliptical mirror 12, and as will be described later, after being subjected to the total internal reflection within the rod integrator 130, the luminous flux is emitted from its emitting end face 130B. The relay lens 14 is disposed so that an image formed at the emitting end face 130B is formed on an area $T_1$ to be irradiated, such conjugate relationship being indicated by broken lines. Rays proceeding to the right, as viewed in FIG. 10, from the image of the light source which is formed on a surface $S_1$ by the elliptical mirror 12 transmit through the relay lens 14 as shown in solid lines and form a secondary image of the light source on a surface $S_2$ located short of the region to be irradiated, whereupon they become divergent. The field lens 15 has a focal position in the vicinity of the secondary image and is disposed close to the surface to be irradiated. The field lens 15 has the function of converting rays shown in solid lines into parallel irradiation light $L_4$, which irradiates the region to be irradiated $T_1$.

A picture is displayed in the surface of the light valve 2 of transmission type in response to an electrical signal from a drive circuit, which is not specifically shown. Luminous flux L5 which transmits through the light valve 2 also transmits through the projection lens 3, which provides projected light L6 forming an enlarged picture on the screen 4 to be viewed. As is known, where the projection lens 3 is not telecentric, a field lens (not shown) may be suitably disposed immediately behind the light valve 2 (or toward the projection lens 3) or immediately in front thereof (toward the lamp 11), thus enhancing the efficiency of incidence of the irradiation light L5 upon the projection lens 3.

FIG. 11 is a cross section illustrating the operation of the rod integrator 130 of FIG. 10. Converging light $L_1$ is condensed at a condensing point 130C located in the vicinity of an incident end face 130F for impingement into the rod integrator 130. For the sake of brevity, only rays appearing in y-z plane of the coordinate system are shown. Incident rays are subject to the total internal reflection by lateral surfaces 130T and 130U or directly proceed to the right straightforward to reach the emitting end face 130B. Luminous flux subjected to the total internal reflection by the lateral surfaces 130T and 130U irradiates the emitting end face 130B in superimposed manner depending on combinations of surfaces where the total internal reflection occurs as if it represents rays emitted from virtual point sources $C_1$, $C_2$, $C_3$, $C_4$ and the like located in a plane which includes the incident end face 130F, with consequence that the emitting end face 130B is irradiated with a good uniformity thereacross. It is to be noted that the rod integrator 130 is in the form of a square pillar, and accordingly, the superimposed irradiation of the end face 130B also takes place by light which has undergone the total reflection by the remaining two lateral surfaces when considered in the x-z plane.

It is a feature of an irradiation optical system which uses a rod integrator to irradiate a light valve that an image on the emitting end face of the rod integrator is focused on the light valve by a relay optical system. Thus, when the rod integrator has a sufficient length, if the illuminance distribution is nonuniform on the incident side, an irradiating flux having an improved uniformity and a configuration substantially congruent to a desired area to be irradiated can be obtained on the emitting side and is led to the light valve for improving the efficiency of utilization of light from the light source. When combined with a strictly controlled imaging optical system, there can be realized an irradiation optical system which exhibits a reduced chromatic aberration and a very high transmission.

A light valve irradiation system incorporating a rod integrator will now be considered with reference to FIG. 12A, wherein an image of a light source is indicated at 101, a region to be irradiated at 201 and an irradiation optical system at 1001. The area of the image is designated by $S_1$, a total solid angle of flux emitted from the image 101 by $\Omega_1$, the area of the region to be irradiated by $S_2$, and a total solid angle of flux which transmits through the region 201 by $\Omega_2$. Assuming for the moment that the irradiation optical system 1001 involves no loss, it is known that the product of the area and the solid angle of flux remains constant across the irradiation optical system. Thus $$S_1 \times \Omega_1 = S_2 \times \Omega_2 \tag{1}$$

FIG. 12A shows an instance where $S_1 < S_2$, and thus it follows that $\Omega_1 > \Omega_2$.

When a prior art rod integrator 130 in the form of a square pillar is used, it will be seen from FIG. 12B that the total solid angle $\Omega_1$ of flux emitted from the rod integrator 130 is equal to the total solid angle $\Omega_1$ emitted from the image 101. While the location of the incident surface on the rod integrator is shown spaced from the image 101, it should be understood that they are coincident. Note that $S_1 > S_1'$. In general, the capacity of the optical system and the limitation imposed on the light valve often result in that $S_1' < S_2$, and a smaller value of $\Omega_2$ is favored frequently in consideration of the display performance of the light valve and demands from a color separation/synthesis optical system and a projection lens system. It will be seen from the equation (1) that a smaller value of $\Omega_2$ may be achieved by increasing $S_2$ in comparison to $S_1'$. However, $S_2$ must be substantially commensurate with the light valve, and can hardly be changed. On the other hand, reducing $S_1'$ to increase the magnification is undesirable since it limits the efficiency of utilization of light from the light source. A improvement may be made in condensing light from the light source such that the area $S_1$ of the image of the light source can be reduced while increasing the efficiency of utilization of light relative to $S_1'$, but this generally involves a side effect of increasing $\Omega_1$. In sum, in order to reduce $\Omega_2$, there is a need for some condensing improvement to be made prior to the irradiation optical system which reduces $\Omega_1$. With the prior art rod integrator 130, the light from the light source is transmitted while retaining its angular distribution, and accordingly, $S_1$ on the light source side had to be increased in order to reduce $\Omega_1$ at the sacrifice of the efficiency of utilization of light.

On the other hand, the size of the light valve is preferably reduced to reduce the volume of the optical system or the entire display apparatus in which it is installed, thus representing a tendency toward a reduction in $S_2$. An irradiation optical system 1001 which satisfies the relationship $S_1'>S_2$ is a reduction optical system, which represents a more stringent requirement on $\Omega_1$ according to the equation (1). Accordingly, it will be seen that it is desirable to provide an irradiation optical system 1001 which represents an enlarging system together with an apparent reduction in Si and $\Omega_1$ on the light source side in order to enable an efficient irradiation of the light valve under the condition that the area $S_2$ is reduced and the solid angle $\Omega_2$ which is sought to be obtained is smaller. However, the requirement of providing an apparent reduction in $S_1$ and $\Omega_1$ is impossible to achieve with the existing rod integrator 130. As a consequence, the only choice is to allow an increase in $\Omega_2$ in order to maintain the efficiency of the optical system, which in turn causes drawbacks including an increased cost of the projection lens and a degradation in the contrast and the color reproducibility.

SUMMARY OF THE INVENTION

It is an object of the present invention to eliminate above drawbacks by providing a light source device capable of controlling a spread angle of a condensed flux from a light source and of irradiating a region to be irradiated evenly with a high efficiency and a high illuminance.

It is also an object of the present invention to provide a light source device capable of controlling a spread angle of a condensed flux from a light source and of irradiating a rectangular region evenly and with a high efficiency and a high illuminance.

It is another object of the present invention to provide a light source device capable of irradiating a rectangular region with an even, parallel flux efficiently and with a high illuminance.

It is a further object of the present invention to provide a projection type display apparatus capable of irradiating an image display region in a light valve with a luminous flux having a reduced spread angle evenly and with a high efficiency and a high illuminance.

It is still another object of the present invention to provide a projection type display apparatus capable of irradiating a rectangular region evenly and with a high efficiency and a high illuminance.

It is a still further object of the present invention to provide a projection type display apparatus capable of providing an even, high illuminance irradiation of an image display region in a light valve by an irradiating flux having a cross-sectional configuration which is analogous to the configuration of the region.

It is yet another object of the present invention to provide a projection type display apparatus capable of providing an even, highly efficient irradiation of an image display region in a light valve by an irradiating flux of a size which is substantially commensurate to or greater than the size of the region.

It is a yet further object of the present invention to provide a projection type display apparatus capable of irradiating a rectangular region with a high efficiency and a high illuminance by an even, parallel luminous flux.

It is a yet further object of the present invention to provide a projection type display apparatus capable of providing an even, highly efficient and high illuminance irradiation of a rectangular region and an efficient impingement of luminous flux which is modulated by a light valve upon a projection lens for purpose of an enlarged projection.

According to an aspect of the present invention, a light source device comprises: a pillar optical element including an incident end face and an emitting end face; a lamp; a condenser means for condensing light emitted from the lamp in the vicinity of the incident end face of the pillar optical element; and a first lens means for forming an image of the emitting end face of the pillar optical element, the first lens means being effective to focus the image of the emitting end face of the pillar optical element at a surface to be irradiated; wherein the pillar optical element includes a tapered portion on a side of the incident end face and a non-tapered pillar portion on a side of the emitting end face, a cross-sectional area of the tapered portion continuously increasing from the incident end face toward the emitting end face and a cross-sectional area of the non-tapered pillar portion being constant.

In the light source device, the incident end face and the emitting end face of the pillar optical element may be both rectangular, luminous flux incident from the incident end face of the pillar optical element undergoing the total internal reflection at a lateral surface of the pillar optical element to be led to the emitting end face.

Further, the light source device may further comprises a second lens means disposed in the vicinity of the surface to be irradiated, the second lens means collimating the irradiating luminous flux which has passed through the first lens means.

According to another aspect of the present invention, a projection type display apparatus comprises: a pillar optical element including an incident end face and an emitting end face; a lamp; a condenser means for condensing light emitted from the lamp in the vicinity of the incident end face of the pillar optical element; a first lens means for forming an image of the emitting end face of the pillar optical element, the first lens means being effective to focus the image of the emitting end face of the pillar optical element at a surface to be irradiated; a light valve for forming a picture image on a surface thereof; and a projection lens means for projecting the image displayed in the light valve with a magnification; the first lens being effective to form an image of the emitting end face of the pillar optical element in an image display region within the surface of the light valve;

wherein the pillar optical element includes a tapered portion on a side of the incident end face and a non-tapered pillar portion on a side of the emitting end face, a cross-sectional area of the tapered portion continuously increasing from the incident end face toward the emitting end face and a cross-sectional area of the non-tapered pillar portion being constant.

In the projection type display apparatus, the incident end face and the emitting end face of the pillar optical element may be both rectangular, luminous flux incident from the incident end face of the pillar optical element undergoing the total internal reflection at a lateral surface of the pillar optical element to be led to the emitting end face.

In the projection type display apparatus, the emitting end face of the pillar optical element may have a configuration which is analogous to a configuration of the image display region in the light valve.

In the projection type display apparatus, the image formed by the first lens means may have a size which is commensurate to or greater than a size of the image display region in the light valve.

The projection type display apparatus may further comprise a second lens means disposed in the vicinity of the surface to be irradiated, the second lens means collimating the irradiating luminous flux which has passed through the first lens means.

The projection type display apparatus may further comprise a third lens means disposed in the vicinity of the light valve for refocusing an image of the lamp formed by the first lens means to a point located in the vicinity of an entrance pupil of the projection lens.

With the light source device according to the present invention, a desired value of parallelism can be achieved for the luminous flux condensed from the lamp by controlling the tapered angle of the partly tapered rod. Accordingly, the spread angle of the irradiating luminous flux which diverges from the image of the emitting end face of the pillar optical element can be reduced, thereby allowing a compact relay optical system to be used to focus an image of the emitting end face of the pillar optical element on the surface to be irradiated. As a consequence, the desired region can be selectively and evenly irradiated with a high illuminance.

Since the rectangular region to be irradiated can be irradiated with the irradiating luminous flux having a configuration which is analogous to the configuration of region and which is sized commensurate to or greater than the region, there can be provided a high efficiency and a high illuminance, rectangular region irradiating apparatus.

The field lens disposed in the vicinity of the surface to be irradiated on the side nearer the light source allows the irradiating luminous flux in the marginal area of the region to be enhanced without any substantial influence upon the configuration of the irradiating luminous flux, thus enabling rectangular region to be irradiated with a high efficiency and a high illuminance.

In the projection type display apparatus according to the present invention, the light valve can be irradiated with luminous flux having a high parallelism, whereby the efficiency of utilization of the light is high, allowing a compact arrangement to be provided. In this manner, a projected image with a high illuminance, a high contrast and a high uniformity of illuminance can be obtained.

Since the emitting end face of the partly tapered rod is rectangular, the total internal reflection at the lateral surfaces of the partly tapered rod provide a plurality of virtual light sources to achieve an even irradiation, thus providing the irradiating luminous flux which is suitable for irradiating the light valve.

Since the rectangular light valve is irradiated by the rectangular luminous flux which has an analogous configuration, there can be implemented a display type projection system having a high efficiency of utilization of light.

In addition, since the rectangular light valve is irradiated by rectangular luminous flux having a size which is commensurate to or greater than the light valve, there is implemented a projection type display apparatus having a high efficiency of utilization of light.

The field lens disposed in the vicinity of the light valve, but toward the light source allows the irradiating luminous flux around the marginal area of the image display region of the light valve to be enhanced without any substantial influence upon the configuration of the irradiating luminous flux, thus allowing a projected image of a high evenness to be provided with a high efficiency and high illuminance.

Moreover, the field lens disposed in the vicinity of the light valve allows a secondary image of the light source to be refocused at the entrance pupil of the projection lens, thereby allowing a projection type display apparatus of a high luminance and a high evenness of screen to be provided in a simple arrangement.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Further scope of applicability of the present invention will become apparent from the detailed description given hereinafter. However, it should be understood that the detailed description and specific examples, while indicating preferred embodiments of the invention, are given by way of illustration only, since various changes and modifications will become apparent to those skilled in the art from the detailed description.

A light source device according to an embodiment of the present invention functions to irradiate a surface to be irradiated evenly and with a high illuminance by controlling an spread angle of a luminous flux emitted from a lamp in accordance with the taper angle of a lateral surface of a pillar optical element in a region where it is tapered.

An emitting end face of the pillar optical element is rectangular, whereby first lens means functions to irradiate a rectangular region with light from an image of a lamp.

Second lens means functions to substantially collimate an irradiating luminous flux.

Further, a projection type display apparatus according to another embodiment of the present invention functions to control a spread angle of a luminous flux emitted from a lamp in accordance with the taper angles of the lateral surfaces of a pillar optical element in a region where it is tapered so as to irradiate an image display region defined within a light valve evenly and with a high illuminance.

The fact that the emitting end face of the pillar optical element is rectangular serves to allow the first lens means to irradiate an image display region in a light valve with a rectangular irradiating luminous flux.

This also serves to provide a rectangular irradiating luminous flux which is analogous to the configuration of the image display region in the light valve.

First lens means functions to focus an image formed on the emitting end face of the pillar optical element to a point located in the vicinity of a light valve in a size which is substantially commensurate to or greater than the size of the rectangular region.

Second lens means is disposed in the vicinity of the incident end of the light valve, and serve to substantially collimate a light valve irradiating luminous flux.

Third lens means disposed in the vicinity of the light valve serves to refocus an image of the lamp which is formed by the first lens means to a point located in the vicinity of the entrance pupil of a projection lens.

First Embodiment

Figure 1:
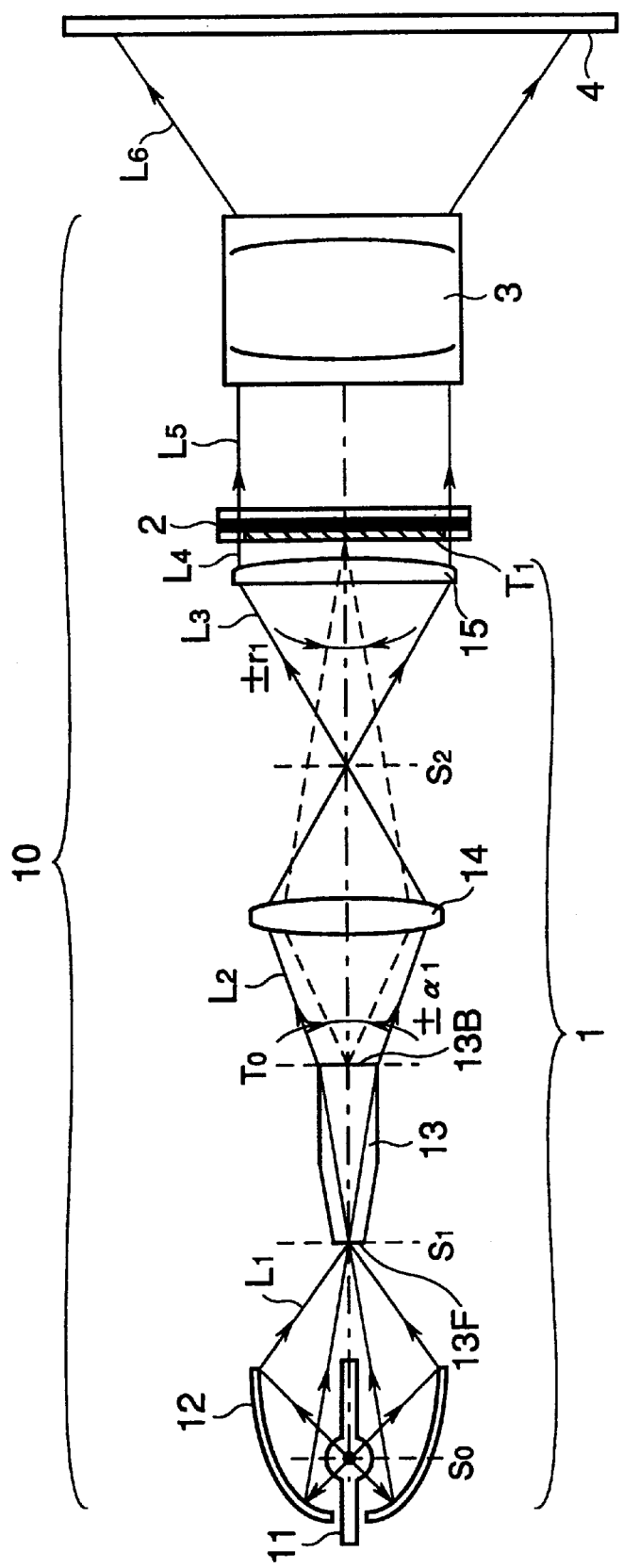
FIG. 1 is a diagram schematically showing a light source device and a projection type display apparatus according to a first embodiment and a second embodiment of the present invention.

FIG. 1 is a schematic view of a light source device according to a first embodiment of the present invention and a projection type display apparatus which incorporates it according to a second embodiment of the present invention. A light source device 1 includes a lamp 11, an elliptical mirror 12, a partly tapered rod 13 as a pillar optical element, a relay lens 14 and a field lens 15. In FIG. 1, $S_0$, $S_1$ and $S_2$ represent planes where an image of the lamp is formed. A converging flux $L_1$ is formed as emitted from the lamp 11 and condensed by the elliptical mirror 12. A divergent flux $L_2$ is emitted from the partly tapered rod 13, and continues to a flux $L_3$ which is once converged by the relay lens 14 and becomes divergent again beyond the plane $S_2$. The field lens 15 forms substantially collimated flux $L_4$.

The operation of the light source device will now be described. The center of emission of the lamp 11 is disposed in the vicinity of the first focal point of the elliptical mirror 12, whereby a luminous flux emitted by the lamp 11 is reflected by the elliptical mirror 12 before it is condensed at a point located in the vicinity of a second focal point.

The partly tapered rod 13 has an incident end face 13F which is disposed in the vicinity of the condensing point. As will be described later, a luminous flux which is subjected to the total internal reflection within the partly tapered rod 13 is emitted from an emitting end face 13B. The relay lens 14 is disposed so as to form an image of the emitting end face 13B on a surface to be irradiated $T_1$, shown hatched. The conjugate relationship is indicated in FIG. 1 by broken lines. The flux $L_2$ shown in solid lines, which is emitted from the partly tapered rod 13, transmits through the relay lens 14 and forms a secondary image of the light source in the plane $S_2$ located short of the surface $T_1$ to be irradiated, and then becomes divergent. The field lens 15 has a focal point in the vicinity of the secondary image, and is also disposed close to the surface to be irradiated. The field lens 15 converts rays $L_3$, shown in solid lines, into a collimated irradiating flux $L_4$ which irradiates the surface to be irradiated $T_1$.

Since the field lens 15 is disposed in the vicinity of the surface $T_1$ to be irradiated, it has little influence upon the conjugate relationship of the relay lens 14 indicated in broken lines. It will be apparent from the foregoing description that the light emitting surface $S_0$ of the lamp 11, the plane $S_1$ containing the second focal point of the elliptical mirror 12 and the plane $S_2$ located beyond the relay lens 14 are conjugate to each other, and an image of the lamp 11 is formed on these planes. Further, the surface $T_1$ to be irradiated and the plane $T_0$ containing the emitting end face 13B of the partly tapered rod 13 are also conjugate to each other, whereby an irradiating luminous flux having a cross-sectional configuration which is analogous to the configuration of the emitting end face 13B is irradiated upon the surface $T_1$ to be irradiated.

Figure 2:
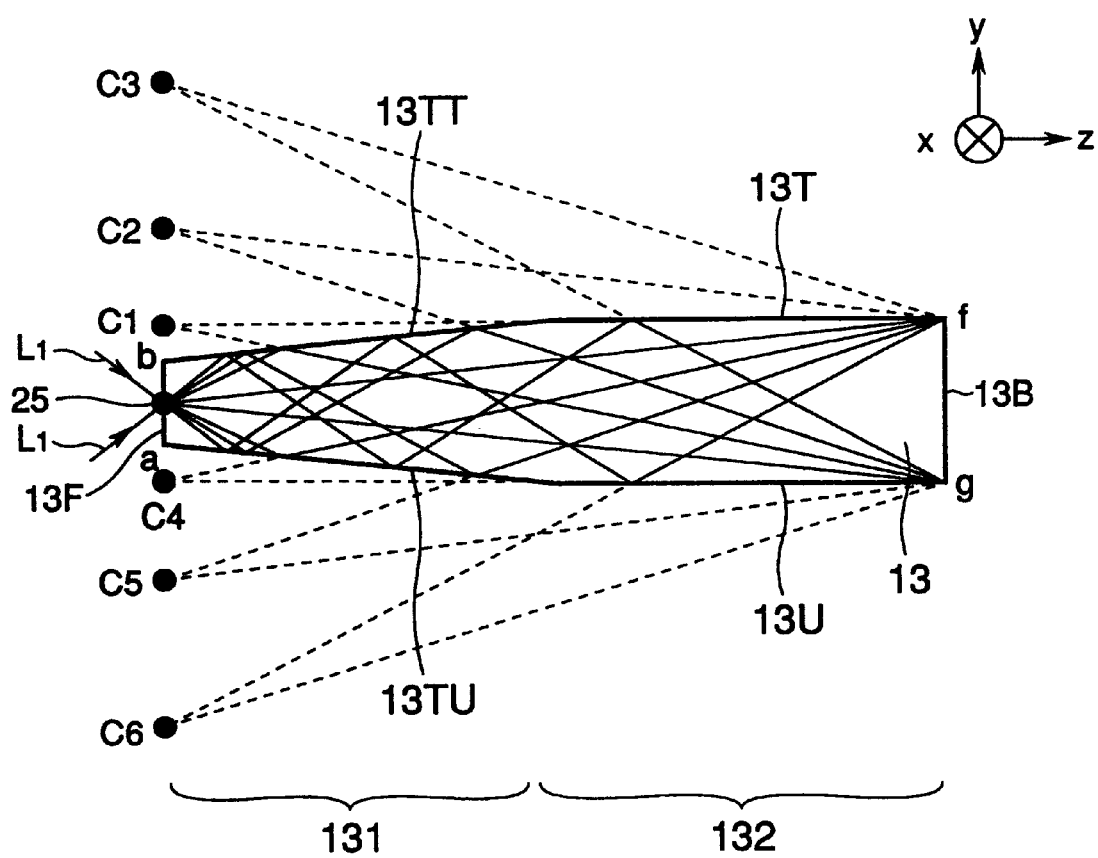
FIG. 2 is a diagram for explaining an operation of a partly tapered rod integrator.

FIG. 2 is a cross section illustrating the operation of the partly tapered rod of FIG. 1. The partly tapered rod 13 comprises a tapered portion 131 and a non-tapered pillar portion 132 of a uniform thickness. Converging light L, is condensed at a condensing point 25 which is located in the vicinity of the incident end face 13F for impingement into the partly tapered rod 13. For the sake of brevity, only those rays which appear in y-z plane of the coordinate system are shown. Incident rays are subject to the total internal reflection by lateral surfaces 13TT and 13TU of the tapered portion 131 and by lateral surfaces 13T and 13U of the non-tapered pillar portion or directly proceeds to the right straightforward to reach the emitting end face 13B. Luminous flux subjected to the total internal reflection by the lateral surfaces irradiates the emitting end face 13B in superimposed manner depending on combinations of surfaces where the total internal reflection occurs as if it represents rays emitted from virtual point sources $C_1$, $C_2$, $C_3$, $C_4$, $C_5$, $C_6$ and the like located in a plane which includes the incident end face 13B, with consequence that the emitting end face 13B is irradiated with a good uniformity thereacross. It is to be noted that the luminous flux which has undergone the total internal reflection by the remaining four lateral surfaces (13TL, 13TR, 13L, 13R in FIGS. 4A and 4B) similarly irradiates the emitting end face 13B in superimposed manner when considered in the x-z plane.

Figure 3A:
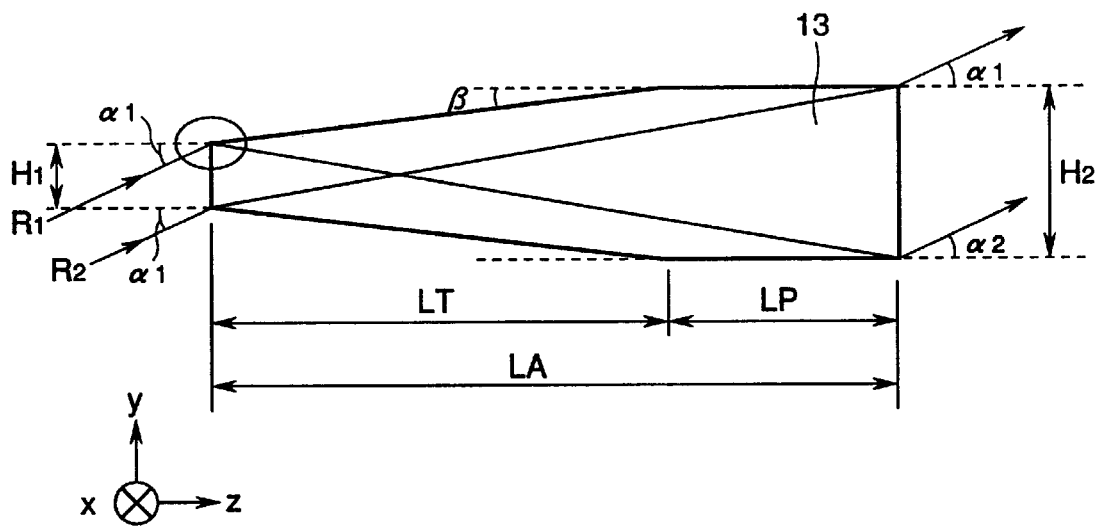
FIGS. 3A and 3B are diagrams for explaining a configuration of the partly tapered rod of FIG. 2.

FIG. 3A is a cross section of a partly tapered rod 13 similar to that shown in FIG. 2. As in FIG. 2, only those rays which appear in the y-z plane of the coordinate system are shown in FIG. 3A. The length LA of the partly tapered rod 13 can be determined so that a luminous flux R1 which is directly emitted from the incident end face to the emitting end face has a maximum emitting angle of $\alpha_1$. The non-tapered pillar portion of the partly tapered rod 13 has a length of LP which may be chosen to a minimum length required to hold the partly tapered rod 13, for example. The remaining length represents the length LT of the tapered portion. This is because it is necessary to minimize an area of contact between the holding means and the partly tapered rod 13 in order to allow a maximum utilization of the total internal reflection occurring on the lateral surfaces and because it is preferred to hold the non-tapered pillar portion rather than holding the partly tapered rod 13 only in the region of a tapered portion in order to avoid an interference of the holding means with the incident end face and the emitting end face of the partly tapered rod 13 and to securely hold it in an immovable manner.

When the length LT of the tapered portion is determined, the taper angle B is given as follows:

$$\beta = \tan^{-1}\{(H_2 - H_1)/(2 \cdot LT)\} \tag{2}$$

Figure 3B:
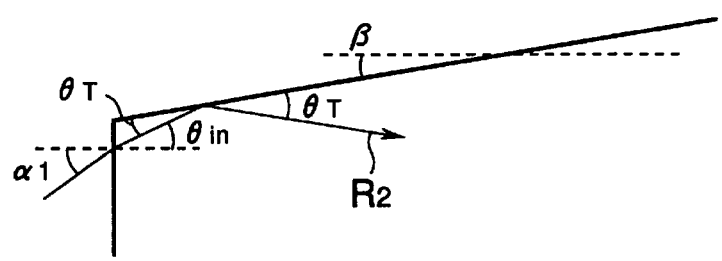

Luminous flux which is reflected by the tapered surface will have its angle within the partly tapered rod improved in respect to parallelism by an amount of angle 2·β. FIG. 3B shows an area encircled in FIG. 3A which is located in the vicinity of the incident end face to an enlarged scale. Denoting an angle of incidence to the partly tapered rod which is placed in the air by a $\alpha_1$, an angle of refraction by $\theta_{in}$, and an angle of incidence and an angle of refraction to the tapered portion by $\theta_T$, we have:

$$\sin \alpha_1 = ng \cdot \sin(\theta_T + \beta) = ng \cdot \sin \theta_{in} \quad (3)$$

where ng represents a refractive index of a medium which forms the partly tapered rod 13. On the other hand, with respect to ray $R_2$, the angle of incidence and the emitting angle with respect to non-tapered pillar portion are equal to each other and are equal to $\theta_T - \beta$, and hence we have $$\sin \alpha_2 = ng \cdot \sin(\theta_T - \beta) = ng \cdot \sin(\theta_{in} - 2\beta) \quad (4)$$

For example, when we choose ng=1.46 and $\alpha_1$=400, then we have $$\theta_{in} = \sin^{-1}(\sin \alpha_1 / ng) = \sin^{-1}(0.5/1.46) \approx 20° \quad (5)$$

Accordingly, assuming taper angle of 2°, we have $$\alpha_2 = \sin^{-1}(1.46 \cdot \sin 16°) \approx 23.8° \quad (6)$$

Figure 4A:
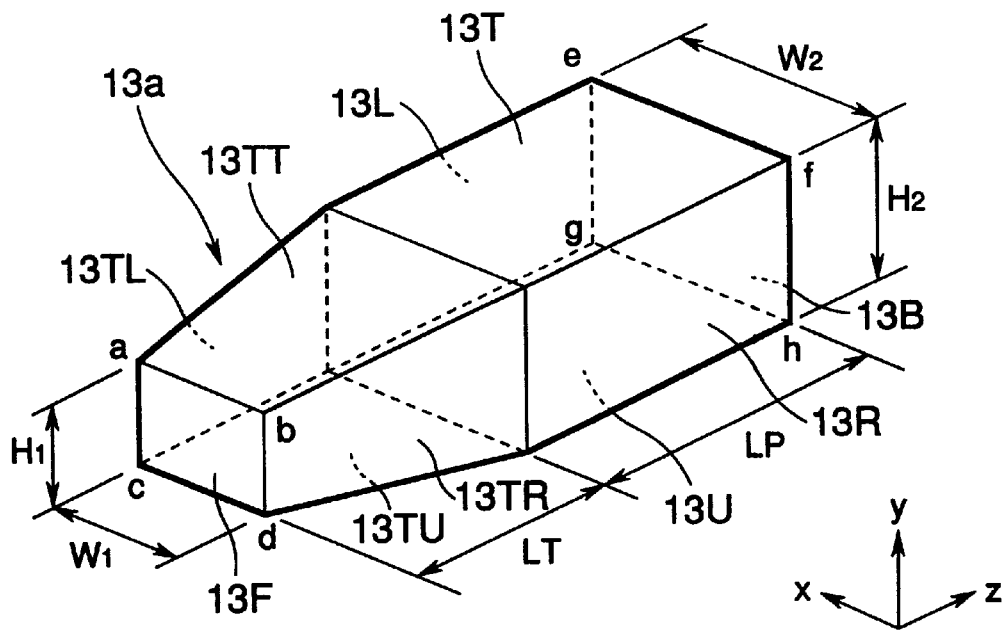
FIGS. 4A and 4B are perspective views showing the construction of the partly tapered rod.

FIG. 4A is a perspective view showing the construction of a partly tapered rod 13a. The partly tapered rod 13a includes a tapered portion having lateral surfaces 13TT, 13TU, 13TL, and 13TR which act to provide the total internal reflection, a non-tapered pillar portion having lateral surfaces 13T, 13U, 13R, and 13L which act to provide the total internal reflection, an incident end face 13F and an emitting end face 13B. As shown, the partly tapered rod 13a comprises a transparent optical element having a rectangular cross section, and it is desirable that dimensions $H_2$ and $W_2$ of the emitting end face 13B exhibit a dimension ratio $H_2:W_2$ which is substantially equal to the aspect ratio of a surface to be irradiated. This is because the cross-sectional configuration of the luminous flux $L_3$ which irradiates the surface $T_1$ shown in FIG. 1 is made to be a conjugate image which is analogous to the emitting end face 13B by means of the relay lens 14. For example, when an image display region of a light valve which is used in a projection type display apparatus which will be described later has an aspect ratio such as 3:4, 4:5, 9:16 or the like, the choice of the rectangle defined by $H_2$ and $W_2$ of FIG. 4 so as to exhibit an aspect ratio of $H_2:W_2$ equal to 3:4, 4:5, 9:16 optimizes the irradiation efficiency. It is necessary that a mirror finish be applied to the respective lateral surfaces 13TL, 13TT, 13TR, and 13TU, and 13L, 13T, 13R, and 13U so as to avoid any interference to providing the total reflection thereat.

On the other hand, dimensions $H_1$ and $W_1$ of the incident end face 13F may be chosen to provide an equal taper angle β (shown in FIGS. 3A and 3B) in both y-z plane and x-z plane, whereby luminous flux emitting from the partly tapered rod will obtain a parallelism which is equal in both the horizontal and the vertical direction. In this instance, the ratio of dimensions $H_1$ and $W_1$ is different from the ratio between $H_2$ and $W_2$ of the emitting side, and will define a rectangular configuration which is more elongate in the horizontal direction. In other words, by changing the lengths $H_1$ and $W_1$ and the ratio therebetween, it is possible to obtain a luminous flux having any desired parallelism in the horizontal and the vertical direction. For example, in an arrangement having $H_2$=15.24 mm, $W_2$=20.32 mm and LT=30 mm, a choice of $H_1 \approx 13.14$ mm and $W_1 \approx 8.22$ mm provides a taper angle which is equal to 2° in both the horizontal direction and the vertical direction, thus providing the common parallelism for luminous flux in either direction.

Figure 4B:
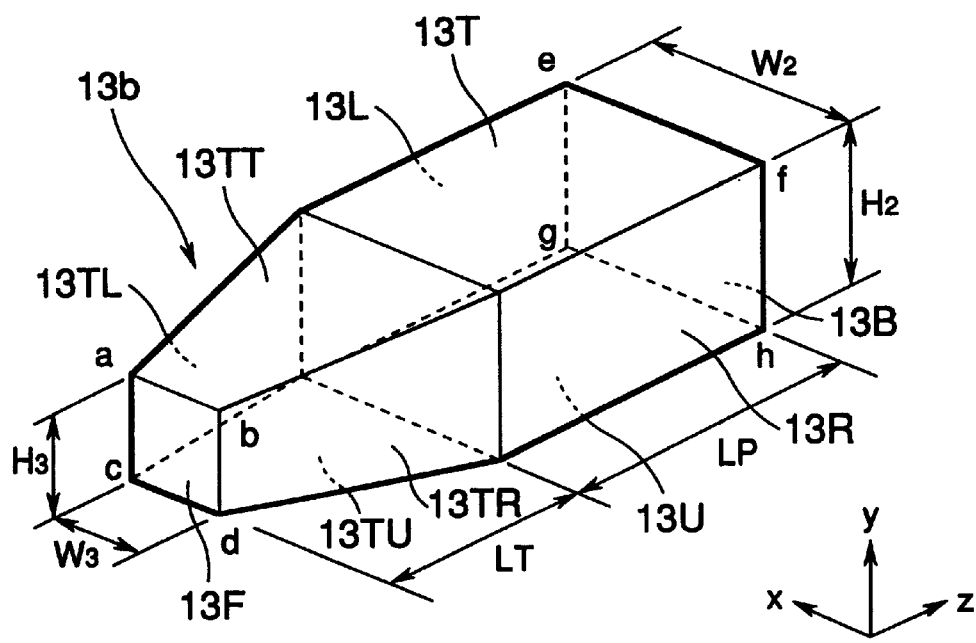

When different parallelisms of luminous flux may be used in the vertical and the horizontal direction, the incident end face 13F may be defined as a square ($H_3=W_3$), as shown in FIG. 4B, thereby allowing the efficiency of coupling with the light source to be improved. Such partly tapered rod is designated by reference character 13b, and corresponding reference characters are used as those used in FIG. 4A. For example, for an arrangement in which $H_2$=15.24 mm, $W_2$=20.32 mm and LT=30 mm, a choice of $H_3=W_3$=10 mm provides a taper angle of about 9.76° for the lateral surfaces 13TR and 13TL and a taper angle of 4.99° for the lateral surfaces 13TT and 13TU according to the equation (2). When an anti-reflection coating comprising a thin film of known dielectric material is applied to the end faces 13F and 13B, the irradiating flux can be increased. The partly tapered rods 13a and 13b are formed of a glass material, a plastic material or the like which is transparent in a range of wavelength for the irradiating flux. It is also possible to replace the partly tapered rods 13a and 13b by a hollow structure having the same internal configuration as these rods, but which conducts the luminous flux by specular reflection rather than by the total internal reflection. In this instance, glass, plastics or metals may be used to construct the hollow structure, preferably with a coating of a metal such as aluminum or silver, multiple dielectric films or the like being formed on the internal surface.

Figure 5A:
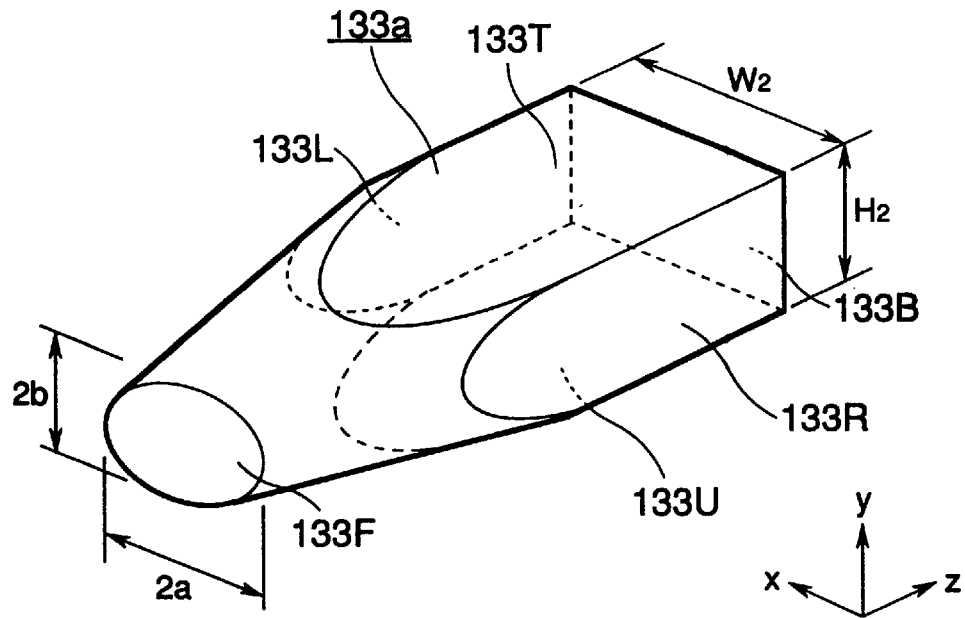
FIGS. 5A and 5B are a perspective view of a modification of the partly tapered rod.

The incident end face may be elliptical in configuration, as shown in FIG. 5A. A partly tapered rod 133a having an elliptical incident end face shown in this Figure includes an incident end face 133F, an emitting end face 133B, and lateral surface 133L, 133R, 133T, and 133U of a non-tapered pillar portion which are similar to the lateral surfaces 13L, 13R, 13T, and 13U shown in FIG. 4A. The configuration shown in FIG. 5A can be obtained by shaving a square pillar having an emitting end face in the form of a rectangle defined by dimensions $H_2:W_2$ from an elliptical cone having a bottom surface which is analogous to the incident end face 133F, defined by an ellipse having lengths of 2a and 2b along the major axis and the minor axis, respectively.

Figure 5B:
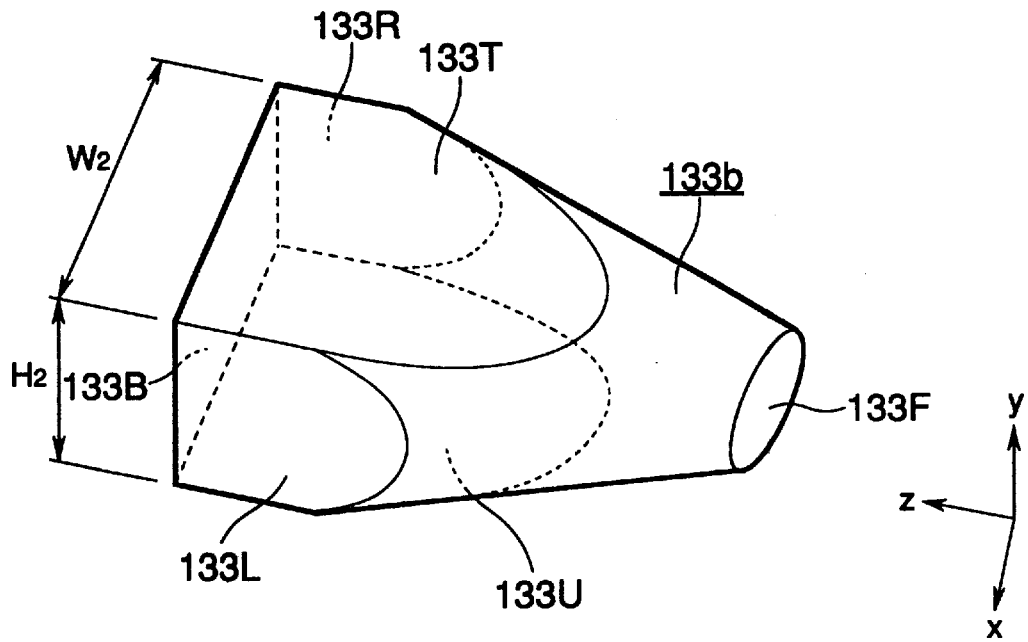

A constant taper angle which does not depend on the direction can be achieved by shaving a square pillar from an elliptical cone having an incident end face 133F, which is in the form of a circle, as shown in FIG. 5B. In this instance, an upper surface 133T and a bottom surface 133U have an area which is greater than the area of lateral surfaces 133R and 133L, and this may result in a difference in the total reflection effect by the tapered surfaces between the vertical and the horizontal direction. However, when the incident end face has an elliptical or circular configuration, a matching with the light flux from the light source is improved, possibly enhancing the coupling efficiency.

Figure 6:
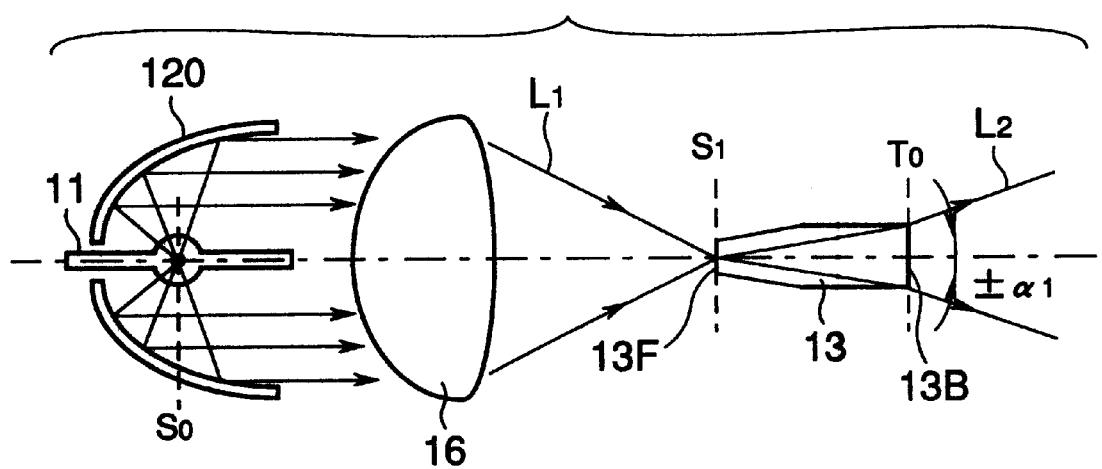
FIG. 6 is a diagram schematically showing a modification of the condenser optical system of the projection type display apparatus according to the second embodiment.

In the first embodiment, the elliptical mirror 12 is used as means for condensing light radiated from the lamp 11. However, alternatively it is also possible to use a condensing optical system which comprises a combination of paraboloidal mirror and a condenser lens, as shown in FIG. 6. In this instance, when luminous flux emitted from the lamp 11 which is collimated by a paraboloidal mirror 120 is condensed by the condenser lens 16 and the incident end face 13F of the partly tapered rod 13 is disposed in alignment with a plane $S_1$ where an image of the light source achieves a minimum size, light from the lamp 11 can be efficiently utilized. The relay lens 14 may be used as described before. However, it is not essential that the relay lens 14 which focuses an image formed on the emitting end face 13F of the partly tapered rod 13 onto a surface to be irradiated be limited to a single lens as in the present embodiment, but a combination lens system may be used at this end to provide a relay optical system in which aberrations are corrected. Obviously, an anti-reflection coating may be applied to the opposite surfaces of such optical element to provide a high transmission optical system. In either instance, the use of partly tapered rod 13 or 133 allows NA of a subsequent relay lens system to be reduced, which provides an advantage in the optical design of a projector in that a diametrical size may be reduced.

In the above description of the present embodiment, the emitting end face 13B of the partly tapered rod 13 is rectangular in configuration. However, if the cross section is other than rectangular, the effect of providing an even luminous flux which is substantially equal in configuration to a desired region in accordance with the present invention can be achieved, if an emitting end face has a cross section which is analogous to the configuration of the region to be irradiated. For example, if a regular hexagonal region is to be irradiated, a partly tapered rod may be used which at least includes an emitting end face 13B formed into a regular hexagonal configuration. Similarly, where it is desired to irradiate a circular region, a cylindrical rod having a circular emitting end face may be used. In such instance, it will be understood that the configuration of the lateral surfaces of the non-tapered pillar portion depends on the configuration of the emitting end face, which may be six lateral surfaces for the regular hexagonal region, and may be cylindrical surface for the circular emitting end face.

Second Embodiment

A projection type display apparatus according to a second embodiment of the present invention will now be described with reference to FIG. 1, which also illustrates the display apparatus together with the light source device of the first embodiment. As shown, the projection type display apparatus comprises a light valve 2 of transmission type for forming an image, and a projection lens 3 in addition to the light source device 1. It is to be noted that other attendant components such as holders or casing are omitted from illustration. Irradiating luminous flux $L_4$ which is emitted from the light source device 1 impinges upon the light valve 2 of transmission type, thus irradiating an image display region $T_1$. Luminous flux transmitting through the light valve 2 impinges on the projection lens 3, which projects projection flux L6 to form an enlarged picture (not shown) on a screen.

Figure 10:
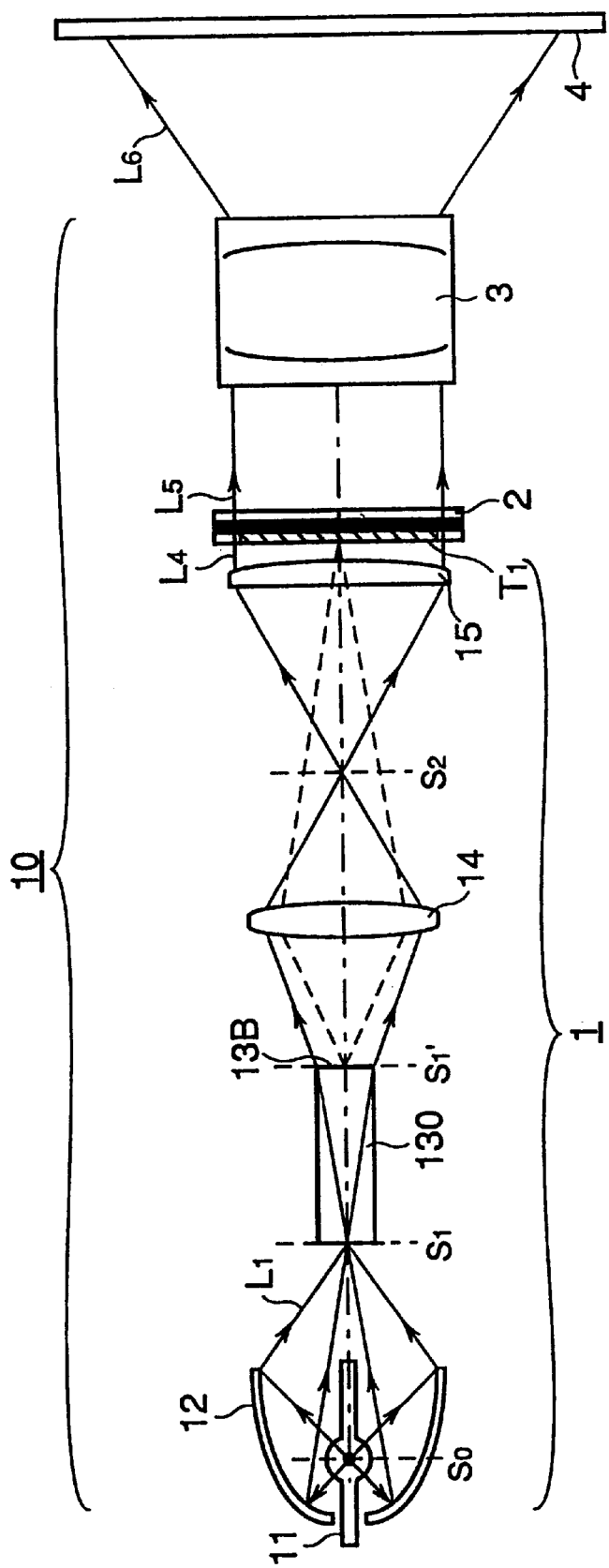
FIG. 10 is a schematic view of a light source device and a projection type display apparatus incorporating a prior art rod integrator.
Figure 11:
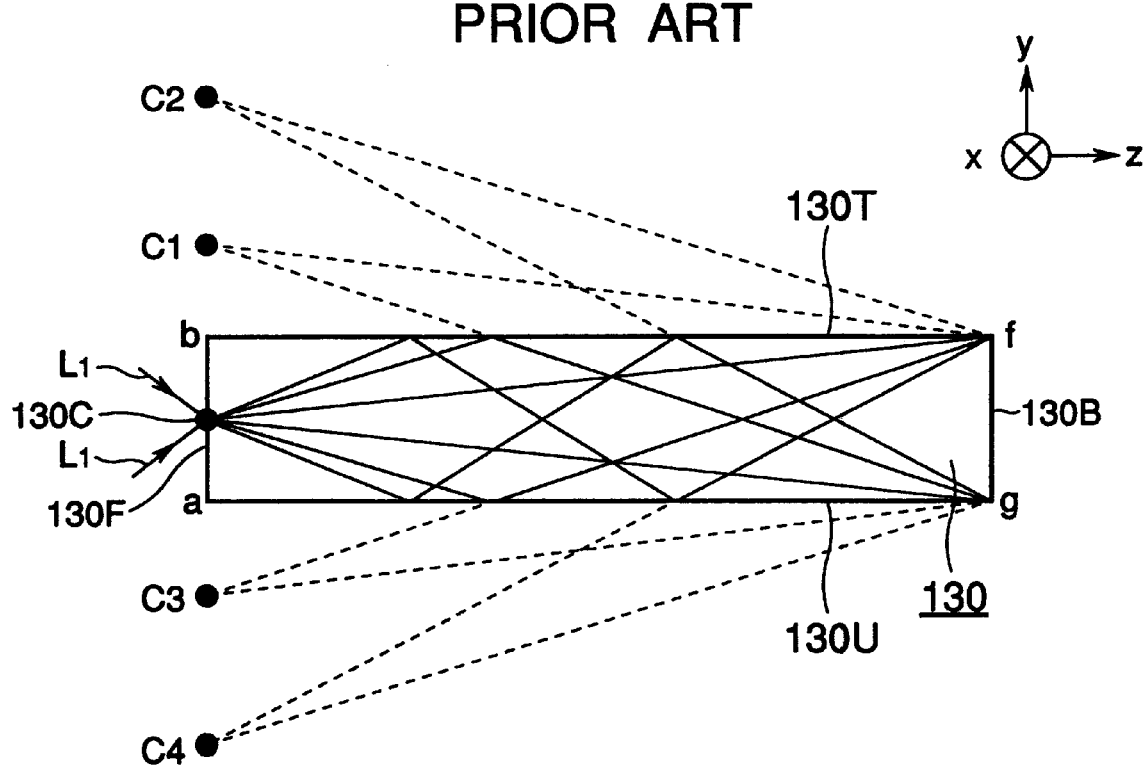
FIG. 11 is a cross section illustrating the operation of the prior art rod integrator of FIG. 10.
Figure 12A:
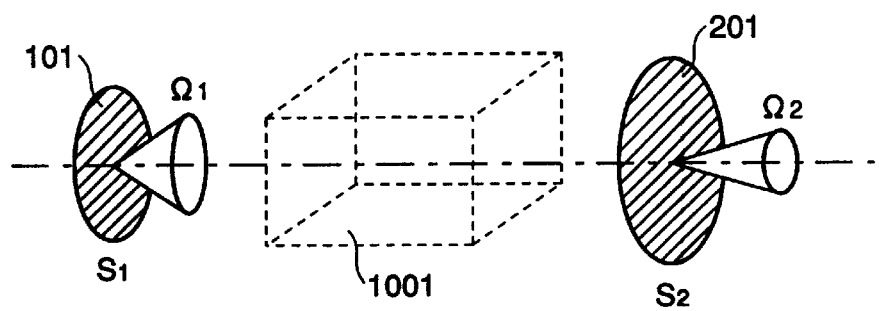
FIGS. 12A and 12B are illustrations of a basic principle of the irradiating optical system.
Figure 12B:
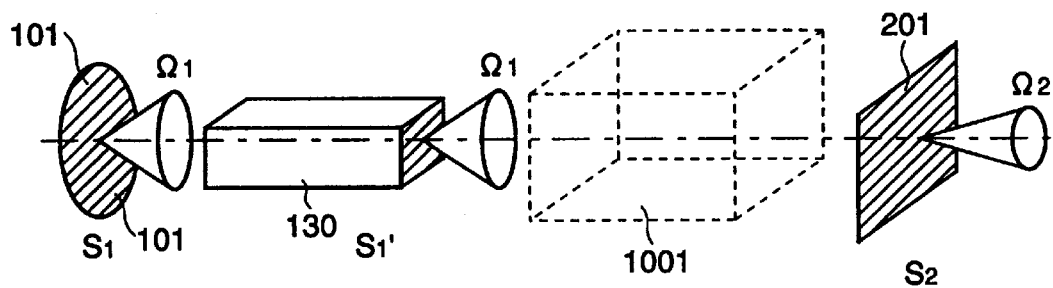

A difference of the second embodiment over a prior art projection type display apparatus as shown in FIG. 10 resides in the use of the partly tapered rod 13, which allows the angle of the converging flux formed by the elliptical mirror 2 to be reduced, which in turn allows a diameter of the subsequent relay lens 14 to be suppressed. This permits the use of a relay lens having a longer focal length and a smaller value of NA, and an optical design is enabled which intends to construct a relay optical system under mitigated requirements for correction of aberrations. The use of the partly tapered rod 13 enables the light valve 2 to be irradiated from the irradiating flux of an analogous configuration which is commensurate to or greater than the light valve, thus allowing a highly efficient projection type display apparatus to be provided which projects an image evenly and with high illuminance. When the parallelism of the irradiating flux is enhanced, the contrast of the projected image is improved in addition to the brightness and evenness, thus improving other responses of the individual optical elements which depend on the angle of incidence of rays.

Third Embodiment

Figure 7:
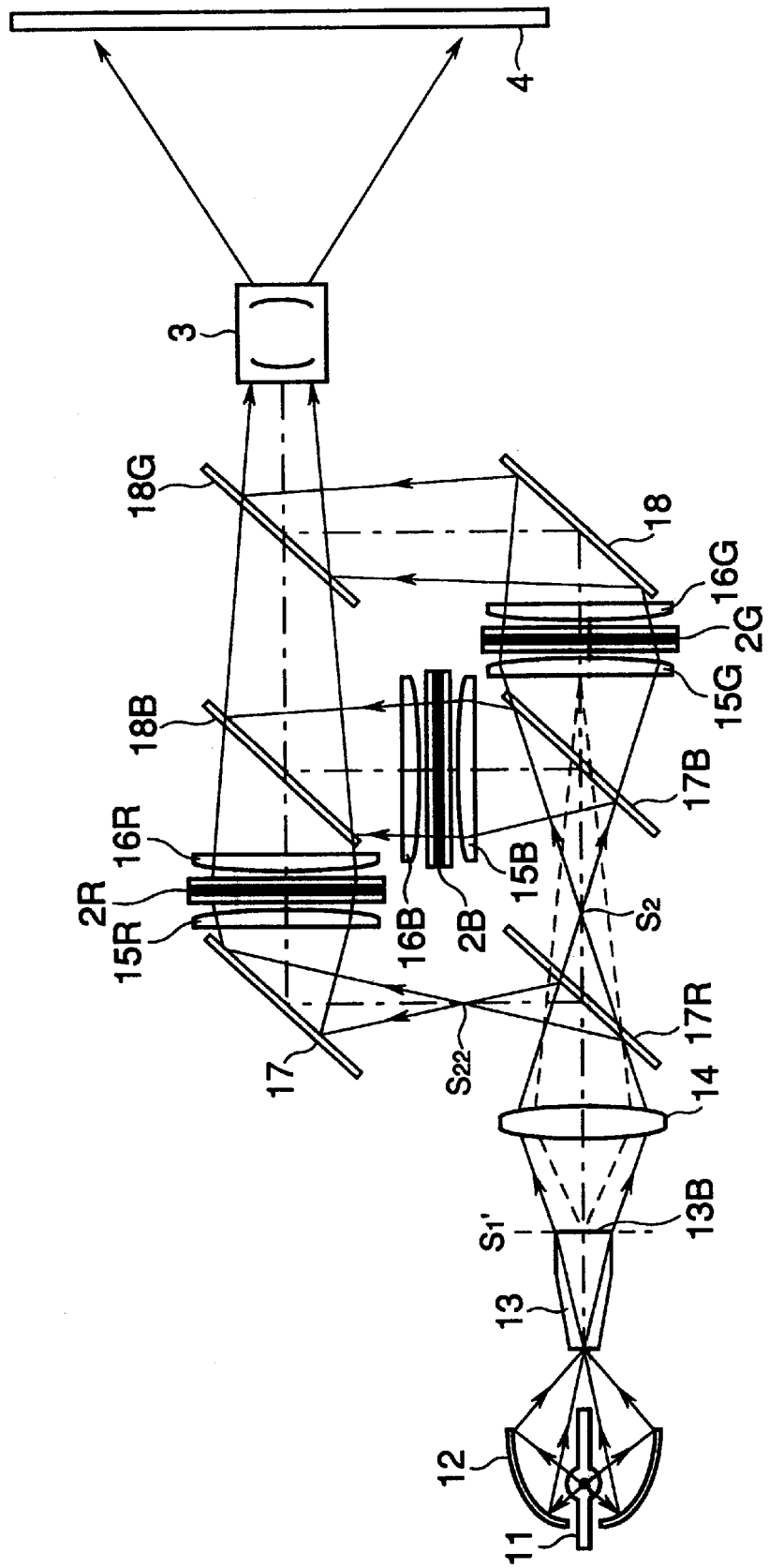
FIG. 7 is a diagram schematically showing the optical system of a projection type display apparatus according to a third embodiment of the present invention.

FIG. 7 is a schematic view of an optical system of a projection type display apparatus according to a third embodiment of the present invention. As shown, the display apparatus includes a projection lens 3, a lamp 11, an elliptical mirror 12, a partly tapered rod 13, a relay lens 14, first field lenses 15R, 15G, and 15B, light valves of transmission type 2R, 2G, and 2B, second field lenses 16R, 16G, 16B, color separating dichroic mirrors 17R and 17B, color synthesizing dichroic mirrors 18B and 18G and mirrors 17 and 18. Further, a numeral 4 denotes a screen.

The operation will now be described. The arrangement and the operation of a portion of the system extending from the lamp 11 to the partly tapered rod 13 remains similar to that described in connection with the first embodiment. In the third embodiment, white light emitted from the relay lens 14 is separated into three colors R, G, and B by dichroic mirrors 17R and 17B and the mirror 17 so as to be passed into and irradiate a total of three light valves 2R, 2G, and 2B which are disposed in alignment with the respective colors. Each of the light valves 2R, 2G, and 2B adds picture information to the light of respective colors, which are then color synthesized by dichroic mirrors 18G and 18B and the mirror 18 to be passed into the projection lens 3. The light which has transmitted through the light valves 2R, 2G, and 2B are condensed toward a position of an entrance pupil of the projection lens 3, again forming an image of the light source in the vicinity of the location of the entrance pupil. Accordingly, the light transmitting through the light valves 2R, 2G, and 2B can be passed to the screen 4 with a high efficiency.

A conjugate image of the emitting end face 13B of the partly tapered rod 13 is formed on an image display surface of each of the light valves 2R, 2G, and 2B through the relay lens 14. In FIG. 7, the manner of focusing an conjugate image for the green light valve 2G is indicated in broken lines. The light valve 2R for the red light and the light valve 2B for the blue light are disposed at an optical distance from the relay lens 14 which is equal to the optical distance to the light valve 2G, and thus, a conjugate image of the emitting end face 13B is formed on their image display surfaces. The image display region of each light valve 2R, 2G, and 2B is irradiated by an irradiating flux having a cross-sectional configuration which is analogous to the configuration of the image display region. Each of the first field lenses 15R, 15G, and 15B is disposed short of and in the vicinity of each corresponding light valve. The front focal point of each of these field lenses 15R, 15G, and 15B is located such that the front focal point of the field lens 15R is in alignment with the position $S_{22}$ of a secondary image of the light source while the front focal point of each of the field lenses 15G and 15B is in alignment with the position $S_2$ of the secondary image of the light source, and accordingly, the irradiating flux for each of the light valves 2R, 2G, and 2B is collimated.

In the third embodiment, each light valve 2R, 2G, and 2B has been described as of transmission type. However, specifically, an approach using a non-liquid crystal panel or oil film can be used. A variety of liquid crystal materials including TN liquid crystal, STN liquid crystal, PDLC, DSM liquid crystal and the like can be used for the liquid crystal panel. A liquid crystal panel drive technique may be of a simple matrix type employing a structure comprising mutually orthogonal strip-shaped periodic electrodes, each opposing a liquid crystal cell, or of an active matrix type comprising an array of switching elements, each carrying picture information, disposed in the display plane.

Fourth Embodiment

Figure 8:
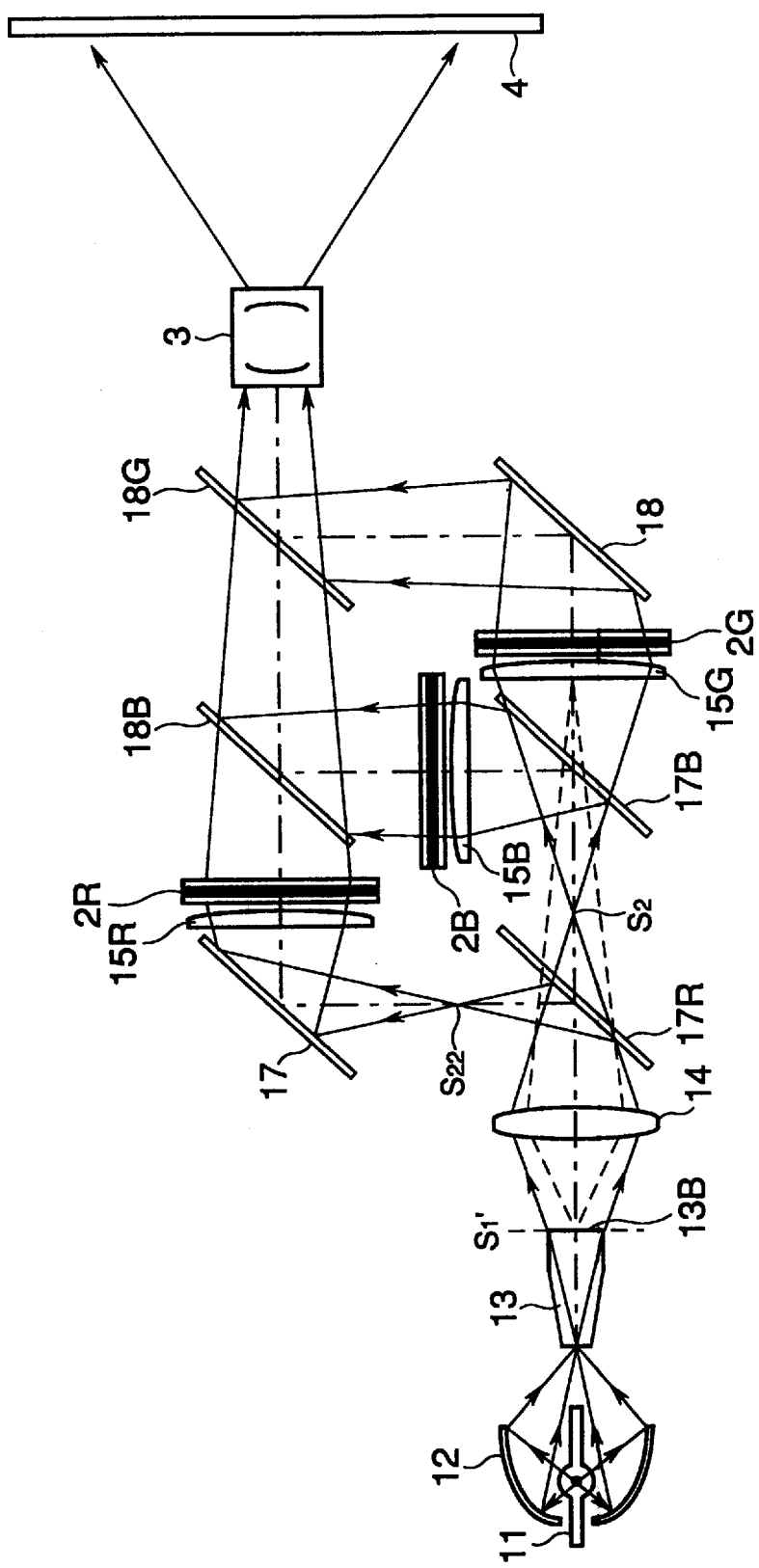
FIG. 8 is a similar view to FIG. 7 for a fourth embodiment of the present invention.

In the third embodiment, the first field lenses 15R, 15G, and 15B and the second field lenses 16R, 16G, and 16B are disposed across and in the vicinity of the light valves 2R, 2G, and 2B, respectively, but it is also possible to provide an integral disposition thereof either immediately in front (toward the light source) of the light valves or immediately beyond (toward the projection lens) the light valves. In such instance, the focal length and the disposition of the condenser lens which is integrally provided may be chosen such that secondary lamp images $S_2$ and $S_{22}$ and the entrance pupil of the projection lens 3 are conjugate to each other. FIG. 8 is a schematic view of an optical system of a projection type display apparatus according to a fourth embodiment of the present invention where the second field lenses 16R, 16G, and 16B shown in FIG. 7 are omitted while allowing the field lenses 15R, 15G, and 15B to form conjugate images of the secondary images $S_2$ and $S_{22}$ of the light source at the entrance pupil of the projection lens 3, thus allowing an efficient incidence of irradiating flux into the projection lens 3.

As mentioned above, the field lenses 16R, 16G, and 16B which are integrally connected together may be disposed on the side of the light valves toward the projection lens 3 in a manner contrary from the illustration of the FIG. 7. It is to be noted that FIG. 8 illustrates the use of the projection lens 3 of non-telecentric type where the entrance pupil is located at a finite distance from the projection lens 3. For a projection lens 3 of telecentric type, the entrance pupil is located at infinity, and accordingly, the images of the light source formed by the field lenses 15R, 15G, and 15B are formed at infinity. In this instance, it is preferred that the irradiating flux transmitting through each of the field lenses 15R, 15G, and 15B be a collimated flux.

Fifth Embodiment

Figure 9:
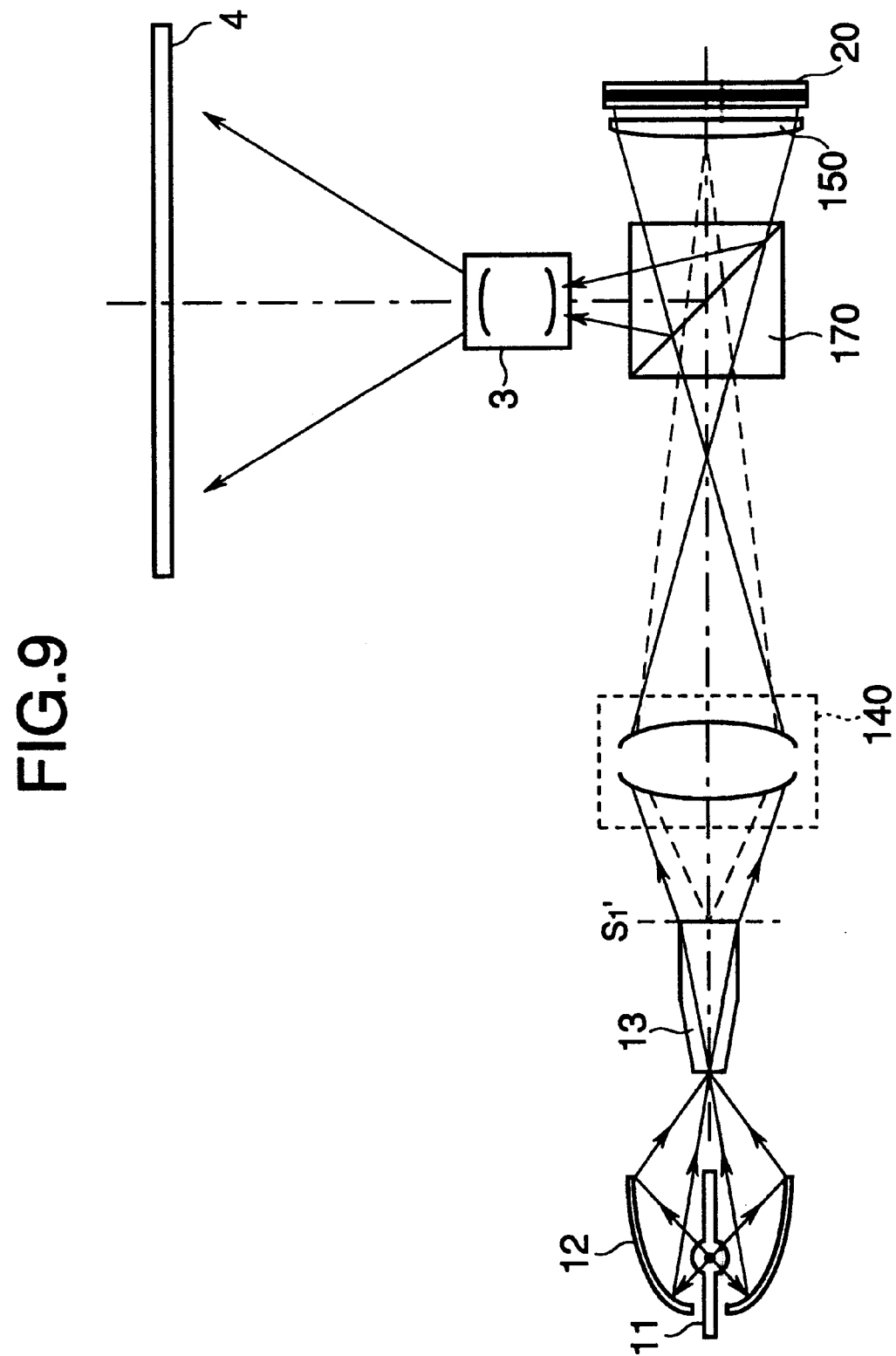
FIG. 9 is a similar view to FIG. 7 for a fifth embodiment of the present invention.

FIG. 9 is a schematic view of an optical system of a projection type display apparatus according to a fifth embodiment of the present invention. In FIG. 9, a numeral 20 represents a light valve of reflex type, 140 a relay lens system, 150 a field lens, and 170 polarizing prism. Other reference numerals and characters remain the same as in FIG. 1. When the light valve 20 of a reflex type is employed, the operation remains substantially similar to that of FIG. 1 where the light valve of transmission type is employed. Specifically, an image of an end face formed in the plane $S_1'$ is transmitted through the relay optical system 140 to the light valve 20 of the reflex type, and flux conveying an image which is emitted by the light valve 20 is projected onto the projection lens 3 with a magnification. Differences are noted in that light emitted from the light valve 20 of the reflex type is polarized by the polarizing 110 to be separated into the projection lens 3 and that the flux which is caused to impinge on the light valve 20 of reflex type by the field lens 150 is substantially collimated and the emitted flux converges toward the entrance pupil of the projection lens 3, thus increasing the projection flux.

In actuality, the emitting end face of the partly tapered rod 13 and the light valve 20 of reflex type may assume a variety of relative ratios of sizes, and accordingly, the relay lens system 140 may have any desired magnification and may have any desired number of lenses. A detailed optical design of such relay lens system 140 enables a light source device which is suitable for irradiating the light valve 20 of reflex type as well as a projection type display apparatus which incorporates it to be implemented. It will be seen that a higher parallelism of an irradiating flux is preferred in consideration of an angle incidence response of each optical element and the response of the light valve 20 of the reflex type, and therefore, it is expected that the function of the partly tapered rod 13 to adjust the parallelism of the flux may improve the efficiency of the utilization of light from the light source device as well as the entire projection type display apparatus.

In the description of the pre sent embodiment, the projection type display apparatus has been disclosed which comprises the single light valve 20 of reflex type. However, a plurality of light valve 20 of reflex type corresponding to three primary colors may be used and in addition, it is also possible to use a plurality of light valves 20 of reflex type inclusive of other constituent colors, with a similar effect. In the above description of the present embodiment, the light valve 20 of a reflex type is assumed to use a liquid crystal for controlling the polarization, thus using the polarizing prism 170 to provide a separation into the irradiating light and the projection light. However, for light valves of scattering type, angle modulation type or density modulation type, half-prism or plate beam splitter may be used as a separator element.

In the fifth embodiment, each light valve has been described as of reflex type, but specifically, a variety of light valves of reflex types can be used including known liquid crystal panel of reflex type employing a ferroelectric liquid crystal or homeotropic liquid crystal, or other light valves such as DMD (digital micromirror device) which utilizes the micromachining technology.

The invention being thus described, it will be obvious that the same may be varied in many ways. Such variations are not to be regarded as a departure from the spirit and scope of the invention, and all such modifications as would be obvious to one skilled in the art are intended to be included within the scope of following claims.

What is claimed is:

1. A light source device comprising:

a pillar optical element including an incident end face and an emitting end face;

a lamp;

a transmissive condenser lens condensing light emitted from said lamp in the vicinity of the incident end face of said pillar optical element; and first lens forming an image of said emitting end face of said pillar optical element, said first lens being effective to focus the image of said emitting end face of said pillar optical element at a surface to be irradiated;

wherein said pillar optical element is formed as a single solid element and includes a tapered portion on a side of said incident end face and a non- tapered pillar portion on a side of said emitting end face, a cross-sectional area of the tapered portion continuously increasing from the incident end face toward the emitting end face and a cross-sectional area of the non-tapered pillar portion being constant, wherein lateral surfaces of said pillar optical element act to provide substantially total internal reflection and wherein a length of the tapered portion LT, a height of the incident end face H1, a height of the emitting end face H2, and a taper angle $\beta$, are related by: $\beta = \tan^{-1}\{(H2-H1)/(2 \cdot LT)\}$.

2. The light source device of claim 1, wherein the incident end face and the emitting end face of the pillar optical element are both rectangular, luminous flux incident from the incident end face of the pillar optical element undergoing a total internal reflection at a lateral surface of the pillar optical element to be led to the emitting end face.

3. The light source device of claim 1, further comprising a second lens disposed in the vicinity of the surface to be irradiated, said second lens collimating the irradiating luminous flux which has passed through said first lens first.

4. A projection type display apparatus comprising:
- a pillar optical element including an incident end face and an emitting end face;
- a lamp;
- a condenser means for condensing light emitted from said lamp in the vicinity of the incident end face of said pillar optical element;
- a first lens for forming an image of said emitting end face of said pillar optical element, the first lens being effective to focus the image of said emitting end face of said pillar optical element at a surface to be irradiated;
- a light valve for forming a picture image on a surface thereof, and
- a projection lens means for projecting the image displayed in said light valve with a magnification;
- said first lens being effective to form an image of the emitting end face of said pillar optical element in an image display region within the surface of said light valve;
- wherein said pillar optical element includes a tapered portion on a side of the incident end face and a non-tapered pillar portion on a side of the emitting end face, a cross-sectional area of the tapered portion continuously increasing from the incident end face toward the emitting end face and a cross-sectional area of the non-tapered pillar portion being constant, wherein lateral surfaces of said pillar optical element act to provide substantially total internal reflection and wherein a length of the tapered portion LT, a height of the incident end face H1, a height of the emitting end face H2, and a taper angle $\beta$, are related by: $\beta=\tan^{-1}\{(H2-H1)/(2 \cdot LT)\}$.

5. The projection type display apparatus of claim 4, wherein the incident end face and the emitting end face of the pillar optical element are both rectangular, luminous flux incident from the incident end face of the pillar optical element undergoing a total internal reflection at a lateral surface of the pillar optical element to be led to the emitting end face.

6. The projection type display apparatus of claim 4, wherein the emitting end face of said pillar optical element has a configuration which is analogous to a configuration of the image display region in said light valve.

7. The projection type display apparatus of claim 4, wherein the image formed by said first lens means has a size which is commensurate to or greater than a size of the image display region in said light valve.

8. The projection type display apparatus of claim 4, further comprising a second lens means disposed in the vicinity of the surface to be irradiated, said second lens means collimating the irradiating luminous flux which has passed through said first lens means.

9. The projection type display apparatus of claim 4, further comprising a third lens means disposed in the vicinity of said light valve for refocusing an image of the lamp formed by said first lens means to a point located in the vicinity of an entrance pupil of said projection lens.

10. A light source device comprising:
- a light emitting device emitting light focussed to a focus point;
- a pillar optical element provided substantially at said focus point and formed of a solid material transparent to the light wavelengths of interest and having surfaces provided with a mirror finish generally exposed to air to facilitate substantially total internal reflection of light passing therethrough, wherein lateral surfaces of said pillar optical element act to provide substantially total internal reflection, said pillar optical element including,
  - an incident end face,
  - emitting end face,
  - a tapered portion adjacent to said incident end face, and
  - a columnar portion adjacent said emitting end face; and
- a first lens forming an image of said emitting end face of said pillar optical element, said first lens being effective to focus the image of said emitting end face of said pillar optical element at a surface to be irradiated, a cross-sectional area of the tapered portion continuously increasing from the incident end face toward the emitting end face and wherein a length of the tapered portion LT, a height of the incident end face H1, a height of the emitting end face H2, and a taper angle $\beta$, are related by: $\beta=\tan^{-1}\{(H2-H1)/(2 \cdot LT)\}$.

11. A light source device comprising:
- a light emitting device emitting light focussed to a focus point;
- a pillar optical element provided substantially at said focus point and including,
  - a rectangular incident end face,
  - a rectangular emitting end face
  - a tapered portion adjacent to said incident end face, and
  - a columnar portion adjacent said emitting end face,
  - a cross-sectional area of the tapered portion continuously increasing from the incident end face toward the emitting end face
  - the ratio of height to width of said incident end face and the ratio of height to width of said emitting end face differing to produce differential parallelism in the height and width directions of the light emitted from said emitting end face of said pillar optical element, wherein lateral surfaces of said pillar optical element act to provide substantially total internal reflection; and
- a first lens forming an image of said emitting end face of said pillar optical element, said first lens being effective to focus the image of said emitting end face of said pillar optical element at a surface to be irradiated and wherein a length of the tapered portion LT, a height of the incident end face H1, a height of the emitting end face H2, and a taper angle $\beta$, are related by: $\beta=\tan^{-1}\{(H2-H1)/(2 \cdot LT)\}$.

12. The light source device of claim 11 wherein said pillar optical element is a hollow structure formed of glass, plastic of metal and coated internally with a metal or multiple dielectric films.

13. A light source device comprising:
- a light emitting device emitting light focussed to a focus point;
- a pillar optical element provided substantially at said focus point and including,
  - a ovoid incident end face,
  - a rectangular emitting end face having a surface area greater than that of said ovoid incident face,
  - a tapered portion adjacent to said incident end face, the tapered portion of said pillar optical element being generally ovoid in cross section, and
  - a columnar portion adjacent said emitting end face, said columnar portion being generally rectangular in cross section, a cross-sectional area of the tapered portion continuously
increasing from the incident end face toward the emitting end face the ratio of height to width of said incident end face and the ratio of height to width of said emitting end face differing to produce differential parallelism in the height and width directions of the light emitted from said emitting end face of said pillar optical element, wherein lateral surfaces of said pillar optical element act to provide substantially total internal reflection and wherein a length of the tapered portion LT, a height of the incident end face H1, a height of the emitting end face H2, and a taper angle $\beta$, are related by: $\beta=\tan^{-1}\{(H2-H1)/(2 \cdot LT)\}$; and a first lens forming an image of said emitting end face of said pillar optical element, said first lens being effective to focus the image of said emitting end face of said pillar optical element at a surface to be irradiated.

14. The light source device of claim 13 wherein said pillar optical element is a hollow structure formed of glass, plastic of metal and coated internally with a metal or multiple dielectric films.

* * * * *